Figure 1:
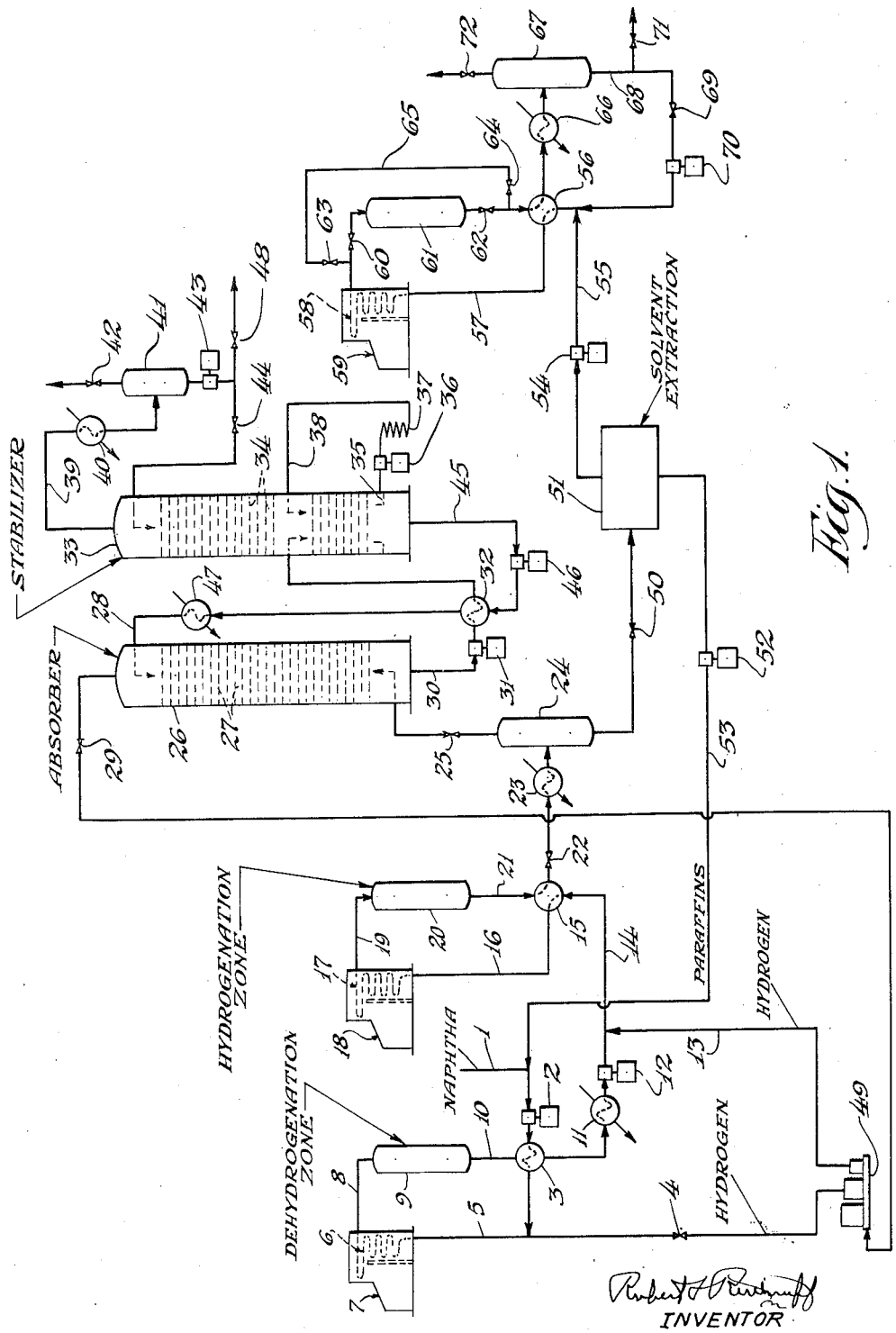

Jan. 16, 1945.   R. F. RUTHRUFF   2,367,530
MANUFACTURE OF DIOLEFINES
Filed Sept. 6, 1940

Robert F. Ruthruff
INVENTOR

Patented Jan. 16, 1945

2,367,530

UNITED STATES PATENT OFFICE 2,367,530

MANUFACTURE OF DIOLEFINS

Robert F. Ruthruff, Chicago, Ill.

Application September 6, 1940, Serial No. 355,623

4 Claims. (Cl. 260—680)

This invention relates to a process for the manufacture of diolefins. More particularly, this invention relates to a process for the manufacture of diolefins from liquid hydrocarbons boiling within the usual motor fuel range. In a more specific sense, this invention relates to a process for the manufacture of diolefins from liquid hydrocarbons boiling within the usual motor fuel range wherein said liquid hydrocarbons are converted to cyclic hydrocarbons of low hydrogen to carbon ratio, the resulting cyclic hydrocarbons are converted to other hydrocarbons of high hydrogen to carbon ratio following which said hydrocarbons of high hydrogen to carbon ratio are split to produce a reaction product comprising diolefins.

The increasing industrial importance of diolefinic hydrocarbons is well known to those familiar with the art. Within recent years the importance of butadiene especially has become more and more generally recognized. This diolefin is the major raw material used in several processes for the manufacture of artificial rubbers of various types. Recent world events have served to enhance the value of any indigenous material capable of being used as a substitute for natural rubber or as a raw material for the production of artificial or synthetic rubber. Accordingly, within recent months, considerable attention has been devoted to an estimation of potential butadiene supplies in the United States and a survey of suitable methods for the preparation of this diolefin. As is well known to those skilled in the art, more or less butadiene is formed during the cracking and reforming of petroleum hydrocarbons, the diolefin being eliminated in the refinery gas stream although a portion may remain dissolved in the gasoline. Unfortunately, to obtain butadiene from this potential source would require the processing of refinery gases from all refining centers in the country. Additionally, the concentration of butadiene in the refinery gas stream is very small so that even moderately complete recovery would be extremely expensive and high recoveries prohibitively so. Also, if it is assumed that all butadiene produced by the petroleum industry could be quantitatively recovered and quantitatively converted to artificial rubber, the resulting product would represent only about 5% of the virgin rubber requirements of the United States. Accordingly, it is evident that the utilization of byproduct butadiene is not only impossible, but in addition, if such utilization were possible, the product resulting would have practically no effect on the supply of rubber and rubber substitutes. It follows that butadiene must be deliberately synthesized if a large amount of artificial rubber is to be made from this diolefin.

Many methods for the production of butadiene from other hydrocarbons are to be found in the literature. For example, it has been suggested that normal butane be catalytically dehydrogenated to normal butenes, these in turn being further catalytically dehydrogenated to produce butadiene. Theoretically, this method of synthesis has many advantages but unfortunately all known catalysts foul very rapidly when used in the second dehydrogenation reaction (normal butenes to butadiene) resulting in short onstream times and large yields of coke and other unwanted byproducts. These disadvantages can be alleviated to a great extent however by following the procedure described in my copending application, Serial Number 299,695, filed October 16, 1939, now U. S. Patent 2,307,240, issued January 5, 1943. Another process for the production of butadiene involves the thermal decomposition of naphthenes, especially cycloolefins, such compounds as cyclohexane, cyclohexene, ethylcyclohexane and the like being employed. This method is highly advantageous but obviously the location of a large supply of suitable charging stock is difficult. As far as I am aware, no one has hitherto suggested an entirely feasible process for the production of butadiene by the processing of liquid hydrocarbons from petroleum.

One object of my invention is to provide a process for the manufacture of diolefins. Another object of my invention is to provide a process for the manufacture of diolefins from liquid hydrocarbons boiling within the usual motor fuel boiling range. A further object of my invention is to provide a unitary catalytic combination process wherein the catalytic operations of dehydrogenation, hydrogenation and cracking cooperate in a highly effective manner to convert liquid hydrocarbons boiling within the usual motor fuel range into diolefins. Additional objects of this invention will become evident as the description thereof proceeds.

Briefly, one embodiment of my invention comprises the following steps: A liquid petroleum fraction falling within the usual motor fuel boiling range is subjected to catalytic dehydrogenation whereby the greater part of the charge is converted to aromatics with the evolution of hydrogen. The liquid products from this catalytic dehydrogenation zone are then subjected to catalytic hydrogenation conditions in the presence of a suitable hydrogenation catalyst, hydrogen from the aforementioned catalytic dehydrogenation zone being preferably employed. The hydrogenated liquid products are finally catalytically cracked at high temperatures to give a large yield of gaseous products containing butadiene.

For the better understanding of my invention, reference may be had to the drawing, forming a part of this specification, and wherein the single figure is a diagrammatic representation of one form of apparatus suitable for effecting the process of the instant invention.

Turning now to a more detailed consideration of the figure, the liquid hydrocarbon charge is introduced through line 1. This charge comprises preferably a liquid hydrocarbon fraction boiling within the usual motor fuel range and even more particularly, a liquid hydrocarbon fraction boiling in the range 125° to 400° F., for example, 150° to 275° F. or 200° to 400° F. The stock chosen may be predominantly paraffinic, predominantly naphthenic, predominantly aromatic or may comprise mixtures of these hydrocarbon types. For example, predominantly paraffinic naphthas obtained from Pennsylvania crude, Michigan crude or from the synthetic crude produced by the catalytic reduction of carbon monoxide with hydrogen may be employed. Or predominantly naphthenic naphthas obtained from certain Gulf Coast crudes or certain California crudes may be charged to the unit. Alternatively, predominantly aromatic naphthas obtained from certain East Indian crudes may be employed. Naphthas from crudes of a more orthodox nature, for example, Midcontinent and East Texas, are also suitable for fresh feed to the process. While any type of naphtha can be used, because of the relatively low value of predominantly paraffinic naphthas and because of the proximity of crudes from which such naphthas can be obtained to consuming centers and for other reasons to be mentioned subsequently, I usually prefer to charge such naphthas to the unit.

The naphtha charge is brought up to some convenient moderate superatmospheric pressure by pump 2, for example, 50 to 500 pounds per square inch more or less, preferably 100 to 300 pounds per square inch. The compressed charge may be preheated if desired by indirect contact with a hot stream (from a source hereinafter to be described) in heat exchanger 3. The charge is preferably but not necessarily mixed with hydrogen entering through valved line 4. About 1 to 10 moles of hydrogen, preferably 2 to 5 moles of hydrogen, may be used per mole of total naphtha charge or, as has been indicated previously, no hydrogen at all need be used. By introducing some hydrogen at this point, the life between regenerations of the catalyst employed in the first catalytic zone is greatly extended and other minor advantages are observed so in the description to follow it will be assumed that the indicated amount of hydrogen is added at this point.

The hydrogen-naphtha stream passes through line 5 and enters coil 6 in furnace setting 7. During passage through coil 6 the charge is heated to an elevated temperature, for example, 850° to 1200° F. more or less, preferably 900° to 1050° F. The thus heated charge passes by transfer line 8 to dehydrogenation reactor 9 which is filled with a suitable catalyst. Any one of a number of catalysts having a combined dehydrogenating and ring closing ability may be employed in reactor 9. Among these may be mentioned chromium oxide gel, especially chromium oxide gel made in accordance with the method described in U. S. Patent 2,211,302, issued August 13, 1940, to John Turkevich and the present applicant. Other eminently suitable catalysts for the purpose comprise minor amounts of oxides of elements from the right hand subgroups of groups IV, V and VI of the Periodic Table after Mendeleeff supported on alumina, especially the variety of alumina known in the arts as activated alumina. Among especially active varieties of catalysts of this general group may be mentioned activated alumina carrying in the neighborhood of 10% chromium oxide by weight and activated alumina carrying in the neighborhood of 5% molybdenum oxide by weight. Another type of catalyst that may be employed in reactor 9 comprises synthetic non-stoichiometric spinels containing an excess of chromium oxide. In the preparation of such materials, one molecular equivalent of nickel oxide or an amount of a nickel compound capable of producing one molecular equivalent of nickel oxide is intimately mixed with more than one molecular equivalent, for example, 10 to 100% more or less in excess of one molecular equivalent of chromium oxide or a compound capable of giving the desired amount of chromium oxide. A potassium chloride or boron oxide or similar mineralizer is incorporated in the resulting intimate mixture and the whole is heated to an elevated temperature, for example, 1800° F. for 2 hours following which the salts are washed from the product leaving the desired catalyst, which may be formed into pills if desired. The chromium oxide and the nickel oxide may be replaced partially or entirely by certain other oxides. For example, the chromium oxide may be replaced partially by alumina while the nickel oxide may be replaced partially or completely by magnesia, zinc oxide or manganese oxide. It is necessary however that an excess of the trivalent metal oxide over that of the divalent metal oxide be employed.

The liquid reaction products leaving reactor 9 via line 10 are rich in aromatics, containing from 40 to 85% aromatics, more or less, depending upon the exact reaction conditions employed. Preferably, the liquid product contains from 50 to 70% aromatics for in this range the conversion is very satisfactory and yet more deep seated reactions with the formation of unwanted byproducts are comparatively unimportant. Generally, a light naphtha, for example, a fraction boiling in the range 150° to 275° F. gives a product containing less aromatics than a heavy naphtha. Additionally, usually somewhat more severe reaction conditions are required when processing light naphtha to form a product of a given aromatic content than when processing heavy naphtha to give a product of the same aromatic content. In addition, the reaction products contain a minor amount, usually 5 to 10%, more or less, of olefins. The reaction products are partially cooled in indirect heat exchanger 3 and the temperature may be further lowered if desired in cooler 11. At this point, gaseous products may be separated from liquid products, the separated gases then being treated to recover hydrogen therefrom. If this is done, any hydrogen sulfide produced from sulfur compounds in the charge during dehydrogenation may also be removed, for example, with a caustic scrubber. Usually however gases and liquids are not separated at this point. It should be noted that if gases and liquids are not separated, the mixture contains sufficient hydrogen for the requirements of the next step about to be described even if no hydrogen was added through valved line 4.

The reaction products, preferably without hydrogen separation, are brought to high superatmospheric pressure in pump 12 and are mixed with additional hydrogen entering through line 13. While in the previous catalytic zone paraffins were dehydrogenated with ring closure (naphthenes present being simply dehydrogenated) in the catalytic zone to follow it is desired to accomplish hydrogenation without ring rupture, i. e., non-destructive hydrogenation. As reaction temperature is increased in the presence of a suitable hydrogenation-dehydrogenation catalyst the naphthene-aromatic equilibrium shifts increasingly in favor of the formation of aromatics. Since in the second catalytic zone about to be described it is wished to convert aromatics to naphthenes, obviously conditions should be so chosen as to promote this reaction as much as possible. To this end, a large excess of hydrogen should preferably be employed the upper limit being actually fixed by economic considerations. Satisfactory results are obtained when employing from 5 to 50 moles of hydrogen or more per mole of aromatics charged. Pressures should be as high as conveniently possible, for example, 500 to 3000 pounds per square inch or more. For reasons already given, the reaction temperatures should be as low as possible consistent with satisfactory reaction speed. As a rule, temperatures of 850° F. or below should be employed, preferably 800° F. or below. By the use of highly active catalysts, subsequently to be described in some detail, adequate reaction rates at even lower temperatures, for example, 500° F. and below, are achieved.

The mixture of hydrogen and aromatic rich liquid passes through line 14 and may be preheated if desired by indirect contact with a heated stream from a source hereinafter to be described in exchanger 15, thence passing by line 16 to coil 17 disposed in furnace setting 18. The charge is brought up to the desired reaction temperature on passage through coil 17, following which it passes via transfer line 19 to catalytic reactor 20. Any suitable hydrogenation catalyst may be employed in reactor 20. Suitable catalysts may be roughly divided into two types (a) highly active catalysts exemplified by nickel, usually on a suitable support, and (b) less active catalysts exemplified by molybdenum oxide and/or sulfide usually on a suitable support. The highly active catalysts may be employed under comparatively mild conditions, for example, pressures of from 500 to 1500 pounds per square inch, more or less, and temperatures of from 400° to 600° F. or thereabouts. The disadvantage of such highly active catalysts is the fact that they tend to become poisoned more or less rapidly during use due largely to the presence of sulfur compounds in the charge to the hydrogenator. With a sulfur free feed some of the more active catalysts are capable of hydrogenating aromatics at an appreciable rate under extremely mild conditions, for example, atmospheric pressure and 150° F. Under such conditions however the smallest trace of sulfur soon ruins catalytic activity. By employing these highly active catalysts under the more strenuous but still comparatively mild conditions already outlined, moderate amounts of sulfur can be tolerated. One great advantage of employing naphthas of a predominantly paraffinic nature as the fresh feed to the unit being described is the fact that such naphthas are usually low in sulfur content. Even when high sulfur stocks are employed, active hydrogenation catalysts may be used in reactor 20 provided that these stocks or reaction products therefrom are at least partially desulfurized before entering reactor 20. This may be accomplished by any convenient means, for example, in reactor 9. As will hereinafter be more fully explained, it is possible to add a desulfurizing action to the previously described ring closing and dehydrogenation actions of certain catalysts suitable for use in reactor 9. When the less active type of hydrogenating catalysts is employed in reactor 20 it is advisable to operate under somewhat more severe conditions than have already been mentioned, for example, in the pressure range 1500 to 3000 pounds per square inch or more and in the temperature range 600° to 800° F. more or less. One great advantage of the less active type of hydrogenating catalysts resides in the great resistance to sulfur poisoning exhibited by them.

Among the catalysts of the more active type may be mentioned nickel, especially nickel mounted on a suitable support such as alumina or kieselguhr. Such catalysts may be prepared in a variety of ways, for example, by precipitating nickel hydroxide in the presence of the support, washing, drying and reducing. Or the support may be saturated with a decomposable nickel compound such as the nitrate, the resulting product is heated to form the oxide (or with some compounds, the metal). The oxide may then be reduced with hydrogen, under pressure if desired. Another active catalyst comprises copper plus magnesia. A mixed solution containing a copper salt and a magnesium salt in the appropriate ratio of one atom of copper to four atoms of magnesium is precipitated as the hydroxides. The precipitate is washed and dried following which the copper oxide is reduced. An additional highly active catalyst for the purpose comprises copper promoted with chromium oxide and a trace of nickel. Such catalysts may contain, for example, 75 to 95% copper, approximately 5 to 25% chromium oxide and a small amount, say 0.2 to 1.0% nickel. A still further group of active catalysts for the hydrogenation reaction comprise non-stoichiometric spinels containing an excess of nickel oxide which prior to or during reaction is reduced to the metal. In the preparation of such materials, one molecular equivalent of chromium oxide or a compound capable of producing the mentioned amount of chromium oxide is intimately mixed with more than one molecular equivalent, for example, 10 to 100%, more or less, in excess of one molecular equivalent of nickel oxide or a compound capable of producing the given amount of nickel oxide. A potassium chloride or boron oxide or similar mineralizer is incorporated in the resulting intimate mixture and the whole is heated to elevated temperatures, for example, 1800° F. for two hours following which salts are washed from the product leaving the desired catalyst which may be formed into pills if desired. The chromium oxide and the nickel oxide may be replaced partially or entirely by certain other oxides. For example, the chromium oxide may be replaced partially or completely by alumina while the nickel oxide may be replaced partially or completely by copper oxide or may be replaced partially by magnesia, zinc oxide or manganese oxide. It is necessary however that an excess of divalent metal oxide over that of the trivalent metal oxide be employed.

Among the less active type of catalysts that may be employed in this hydrogenation reaction may be mentioned molybdenum sulfide, molybdenum oxide, molybdenum oxide promoted with zinc oxide and magnesium oxide, tungsten sulfide and tungsten oxide. These catalysts may be carried on suitable supports such as kieselguhr, pumice, alumina and the like.

The normally liquid reaction products leaving hydrogenation reactor 20 by line 21 consist largely of cycloparaffins and paraffins together with a small amount of aromatics that escaped hydrogenation. Actually, it would be preferable to produce cycloolefins rather than cycloparaffins but with available catalysts the hydrogenation of aromatics to cycloolefins has been impossible to achieve with satisfactory yields. The energy relationships in the system aromatics-cycloparaffins are such that when proceeding in either direction, that is, when hydrogenating aromatics or dehydrogenating cycloparaffins only traces of intermediate compounds can be detected when using known catalysts. The product is partially cooled in indirect heat exchanger 15, partial pressure reduction is accomplished in valve 22 followed by further cooling in cooler 23. The cooled material passes to separator 24. Gaseous products eliminated through valved line 25 are treated so as to separate hydrogen therefrom. This may be accomplished, for example, by absorption. To achieve this, the gaseous products under moderate superatmospheric pressure, for example, 25 to 300 pounds per square inch, depending upon the temperature of the cooling water and other considerations, are sent to absorber 26 via valved line 25. Absorber 26 is provided with means for facilitating liquid-vapor contact such as bubble trays 27 although other suitable devices for the purpose, for example, Raschig ring packing or Berl saddles may be used if desired. Cold absorber oil is introduced into absorber 26 by line 28 and is contacted with the ascending gas stream in said absorber. Unabsorbed gas, consisting essentially of hydrogen, is discharged through valved line 29 while rich absorber oil leaves through line 30, is moved by pump 31 through indirect heat exchanger 32 where it is heated by a hot stream from a source hereinafter to be described, following which it enters stripper 33. Stripper 33 is preferably provided with means for facilitating liquid-vapor contact, top cooling means and bottom heating means. Means for facilitating liquid-vapor contact may take the form of bubble trays 34, although other suitable means, such as Raschig ring packing or Berl saddles may be employed. For bottom heating, liquid may be removed from trap out tray 35 positioned near the bottom of the stripper 33, moved by pump 36 through suitable heater 37 and thence by line 38 for discharge into stripper 33. Other suitable heating means may be employed, either alone or in combination with the device described or other devices, for example, an open steam coil positioned near the bottom of the tower or a similarly positioned closed coil through which heated fluid may be circulated. For top cooling, gaseous products from stripper 33 may be removed through line 39, cooled in cooler 40 and discharged into separator 41. Any uncondensed material may be removed continuously or intermittently at frequent intervals through valved line 42 while liquids may be moved by pump 43, a portion being passed via valved line 44 back to the upper portion of stripper 33 to provide open reflux therein. Other suitable cooling means may be employed, either alone or in combination with the device described or other devices, for example, an upper positioned closed coil through which cold fluid is circulated or cold fluid of suitable properties from an outside source may be added to the upper portion of stripper 33 to provide open reflux therein.

Absorbed materials are removed from the rich absorber oil in stripper 33. Stripped absorber oil leaves by line 45, is moved by pump 46 through indirect heat exchanger 32 wherein it is partially cooled by rich absorber oil, thence through cooler 47 and finally back to absorber 26 via line 28. Absorbed materials eliminated in stripper 33 leave through line 39. The recirculation of part of these back to the stripper to provide open reflux therein has already been described. Liquid material not used to provide reflux passes through valved line 48.

The hydrogen eliminated through valved line 29 passes to compressor 49 for recirculation as described, a certain amount of this hydrogen at moderate pressure may, if desired, be removed from an intermediate compressor stage by valved line 4 and sent to the dehydrogenation zone while the remainder or all of the hydrogen may be removed through line 13 and sent to the hydrogenation zone. The products consisting largely of gaseous hydrocarbons, eliminated through valved lines 42 and 48 may be burned as fuel or otherwise disposed of as desired.

Liquid products from separator 24, which leave this element by valved line 50, may be processed in a variety of ways. As those skilled in the art are aware, these predominantly liquid products contain more or less gaseous products, the amount depending upon the temperature and pressure in separator 24 since separation is never quantitative. These gaseous portions, if desired, may be removed by stabilization, employing means familiar to those skilled in the art. As liquids removed from separator 24 by valved line 50 contain more or less gaseous components, so also gases removed from separator 24 by valved line 25 contain more or less liquid components so if the liquids leaving through valved line 50 are to be stabilized, the products leaving through valved lines 42 and 48 might as well be added thereto and the three streams stabilized together. It is to be understood that stabilization is not necessary and the liquid product leaving separator 24 through valved line 50 may be passed directly to the next reaction zone. However, I prefer to solvent extract the liquid products before passing them to the next reaction zone. If solvent extraction is employed, then it is preferable to first stabilize the liquids.

The solvent extraction zone is indicated by the reference numeral 51. The construction of such extraction units is familiar to those skilled in the art. Herein the liquid products are treated with a selective solvent, for example, liquid sulfur dioxide, to separate them into paraffins and naphthenes (including unreacted aromatics). Paraffinic components may be recycled to the dehydrogenation zone via pump 52 and line 53. Naphthenes (including unreacted aromatics) are passed to the final reaction zone by means of pump 54 and line 55.

The naphthenes are cracked or split either thermally or catalytically with the production of diolefins, particularly butadiene. Rather elevated temperatures and correspondingly short reaction times are employed. For example, temperatures in the range 900° to 1450° F., preferably 1000° to 1350° F. may be employed. The cracking or splitting reaction is conducted preferably at atmospheric or even better, subatmospheric pressures. To aid in reducing the partial pressure of the charge, an appreciable amount, say 0.5 to 5.0 volumes per volume of charge (as gas) of an inert gas such as steam, nitrogen, methane or the like may be added.

The naphthene rich charge is preheated if desired by indirect contact with a heated stream from a source hereinafter to be described in exchanger 56 and then passes by line 57 to coil 58 in furnace setting 59. During passage through coil 58 the charge is heated to the desired reaction temperature and then moves via valved transfer line 60 to reactor 61. Reactor 61 is filled with a suitable catalyst having a cracking effect if the splitting reaction is to be catalyzed; otherwise reactor 61 is empty and serves as a soaking drum. If desired, reactor 61 may be bypassed entirely in the event that non-catalytic cracking is resorted to. This may be accomplished for example, by closing inlet and exit valves 60 and 62 and opening valves 63 and 64, whereby reaction products from furnace coil 58 pass through line 65.

If the charge to coil 58 is to be cracked catalytically, reactor 61 or some similar device is employed to hold the catalyst used. A wide variety of catalysts may be employed in reactor 61. Among these may be mentioned raw or activated clays of the bentonite or montmorillonite type, synthetic silica-alumina complexes and synthetic silica-magnesia complexes. Suitable acid treated clays of the bentonite or montmorillonite type include products marketed under the trade names Super Filtrol and Tonsil. Material prepared synthetically by the hydrolytic adsorption of alumina on silica gel as described in U. S. Patent 2,068,016, issued January 19, 1937, to F. H. Gayer, is very suitable. In the same class may be mentioned synthetic silica-alumina complexes prepared as described in my copending application Serial Number 305,472, filed November 21, 1939. Synthetic magnesia-silica complexes are also very effective as catalysts in the conversion of the naphthene rich charge. Such contact agents may be made in conformity with my copending application, Serial Number 300,390, filed October 20, 1939, now U. S. Patent 2,278,590, issued April 7, 1942. Another highly efficient catalyst for the purpose may be made by suspending a moist, washed precipitate of aluminum hydroxide in water and adding thereto with agitation a dilute water glass solution following which the reaction mixture is brought to a boil and filtered. The precipitate is washed with dilute (5%) sulfuric acid, then with water and is dried to give the finished catalyst. In this preparation, about 2 g. silica are employed per gram of alumina. Similarly active materials may be made by substituting magnesium hydroxide for the aluminum hydroxide. Yet another suitable catalyst may be prepared by adding slowly with agitation to a preferably dilute sodium silicate solution a dilute solution containing an excess of calcium ion, calcium chloride solution for example. The resulting precipitate is separated from the mother liquor and is washed salt free. The moist precipitate is suspended in a solution of a soluble aluminum salt, aluminum chloride or sulfate for example, a slight to moderate excess of aluminum over that required to replace calcium being employed. The suspension is preferably agitated and is brought to a boil and is boiled until reaction is substantially complete which requires about two hours, more or less. The resulting precipitate is removed from the reaction medium, is washed salt free and dried to form the desired catalyst. Instead of any of the above mentioned catalysts natural or synthetic zeolites may be employed.

All of the above mentioned catalysts are also very effective in converting paraffinic hydrocarbons. This illustrates the advisability of separating paraffins and naphthenes and charging only a naphthene rich material to the splitting zone. If the paraffins are charged also these are converted partly to olefins and partly to more branched paraffins. Furthermore, if purely thermal splitting is employed, the paraffins would be largely converted to olefins so in this case also it is desirable to separate before splitting.

Reaction products leaving the reactor through valved line 62 (or, in the case of thermal splitting without a soaking drum, the furnace coil through line 65 and valve 64) consist largely of gaseous decomposition products and unreacted naphthenes. The mixture is partially but rapidly cooled in exchanger 56, further cooled in cooler 66 and sent to separator 67. Liquids may be removed through line 68, pass through valve 69 and be moved by pump 70 to line 55 for recycling to the splitting zone. Part or all of these liquids may be discharged through valved line 71. Part of the liquids are preferably so discharged so as to avoid building up unreactable materials in the splitting circuit. Liquids so eliminated may, if desired, be sent to line 14 by a suitable line (not shown) for recycling to the hydrogenation zone.

Gaseous products eliminated through valved line 72 comprise approximately 20% diolefins, 40% olefins and 25% hydrogen. Diolefins may be separated from the remaining gases by any suitable means, for example, absorption, using glycol or ammonia, or by fractionation under moderate superatmospheric pressure. If desired, the resulting diolefin free gas may be sent to absorber 26, hydrogen therein being eliminated through valved line 29 while olefins are discharged through valved lines 42 and 48. As will be apparent to those skilled in the art, with most charging stocks, more hydrogen is formed during dehydrogenation than is needed for hydrogenation. However, due to imperfect separation, inevitable losses, etcetera, it may be rather difficult to maintain hydrogen balance unless hydrogen from the gas formed during splitting is used also. Any excess hydrogen may be eliminated and burned or otherwise disposed of.

If desired, the olefins leaving the absorber through valved lines 42 and 48 when diolefin free splitting gas is also treated therein may be catalytically polymerized and the polymer may be hydrogenated in the hydrogenation zone whereby these olefins are in effect recycled to the system.

If the splitting reaction is conducted at a pressure lower than the pressure drop through the system, some means must be provided to produce a subatmospheric pressure at the exit to the system, e. g., at valved line 72. Any suitable means, such as a mechanical vacuum pump, a water or steam jet pump or a barometric condenser may be employed. As subatmospheric pressures of 200 mm. are very satisfactory for the splitting reaction and as pressures below say 75 mm. give no greatly improved results, ordinary barometric condensers are the best means to employ since such devices easily and cheaply produce subatmospheric pressures in the range mentioned.

The above description is based on the assumption that a predominantly paraffinic fresh feed is employed. If predominantly aromatic fresh feeds are used, these may, if desired, be introduced just prior to exchanger 15 while if predominantly naphthenic fresh feed is used it may, if desired, be introduced just prior to solvent extraction zone 51. Preferably, predominantly olefinic fresh feeds are not employed largely because such stocks are of greater value in other applications. Additionally such stocks tend to deactivate the catalyst in reactor 9 requiring frequent regenerations if the olefinic feed is introduced through line 1. This can be obviated by introducing the olefinic material just prior to exchanger 15 as has been previously mentioned in connection with polymer, but rarely if ever is such an expedient economically justified. Means for introducing predominantly aromatic (or olefinic) feeds prior to exchanger 15 or for introducing predominantly naphthenic feeds prior to solvent extraction zone 51 are not shown but the necessary pipes and valves for these purposes are self-evident.

Single catalytic reactors are shown at 9, 20 and 61 (as has been mentioned previously, reactor 61 may or may not contain catalyst). As is familiar to those skilled in the art, catalysts during use become more or less covered with a carbonaceous deposit resulting in decline in activity. From time to time, at intervals depending upon the rate of such deactivation, passage of charge over the catalyst is stopped and the catalyst must then be regenerated, for example, by removing the carbonaceous deposits by oxidation through the introduction of air or dilute air. This would require discontinuing operations while regeneration is in progress. To overcome this discontinuity of operation several procedures may be followed, among them being:

(1) Two or more catalyst chambers may be employed in each catalyst zone, the charge being passed through at least one of them while contact agent in at least one other reactor is being regenerated. Periodically the functions of the two are reversed. This procedure is quite satisfactory for reactors 9, 20 and 61 (assuming, of course, that a catalyst is used in 61). If the less active type of hydrogenating catalyst is employed in reactor 20, decline in activity is so slow that usually but one reactor need be employed. When, after weeks or months on stream, the activity of the catalyst therein has fallen below economic limits the whole unit may be shut down and the catalyst replaced.

(2) The catalyst may be passed continuously or intermittently through the reactor. The exhausted or nearly exhausted catalyst discharged from the reactor passes to another vessel in which regeneration occurs, this being accomplished by moving the catalyst through said vessel and contacting it with air or dilute air. The regenerated contact agent discharged from the second vessel is then conveyed to the inlet of the reactor and again passed therethrough. This scheme may be employed when catalyst life is comparatively short. It is especially suited for reactor 9 when the catalyst is also employed as a desulfurizing catalyst. Many of the catalysts previously mentioned as suitable for use in reactor 9, for example, chromium oxide on alumina, have a pronounced desulfurizing action. However, when the active oxide (e. g., chromium) is substantially converted to the sulfide an intense cracking action develops. Hence it is advisable, when passing charge and catalyst through the reactor concurrently to so regulate the catalyst to oil ratio as to prevent the formation of more than the critical amount of sulfide necessary before cracking becomes evident. This requires a higher catalyst to oil ratio than when using sulfur free stocks and hence catalyst life is, in effect, comparatively short. If, on the other hand, the catalyst and feed are passed countercurrently through reactor 9, in order to achieve substantial desulfurization the catalyst, just prior to discharge from reactor 9, must be still quite active as far as dehydrogenation-ring closure is concerned. In other words, a completely or nearly exhausted dehydrogenating-ring closing catalyst has little desulfurizing action so again it is seen that to achieve substantial desulfurization the catalyst to oil ratio must be higher than normal. Also, if a sulfur containing feed is charged to reactor 20 and the more active type of catalyst, previously described, is used therein, the moving catalyst technique is well suited for employment here. Also, if desired, the catalyst (if used) in reactor 61 may be handled by the moving catalyst technique.

(3) The catalyst, in finely divided form, is passed through an elongated conduit in suspension in the vaporized charge. Reaction occurs therein and the mixture leaving the conduit is processed so as to separate contact agent from products and the catalyst is resuspended in air or dilute air and passed through a second elongated conduit. Regenerated catalyst is separated from the suspending fluid after discharge from this second conduit and is then suspended in the vaporized hydrocarbon charge for repassage through the first elongated conduit. This scheme is especially suitable for use when catalyst life is extremely short and/or the reaction temperature is high and hence extremely accurate control of contact time is necessary to avoid secondary reactions. Obviously, this method is suited especially for application to reactor 61 (if a catalyst is used therein) but may be employed in reactor 9 and/or 20.

For further details regarding the above three methods of contacting catalyst and charge reference may be had to my copending application Serial Number 334,741, filed May 13, 1940, now U. S. Patent 2,312,445, issued March 5, 1943.

For a more complete understanding of my invention than is possible from the generalized description just given, a specific example of its application is presented. It is to be understood that this example is illustrative only and in no way should be considered as limiting the invention.

A paraffinic naphtha having a boiling range of 125° to 400° F. and an A. P. I. gravity of 61° was mixed with hydrogen at the rate of 2500 cubic feet per barrel and the mixture was compressed to 200 pounds per square inch, heated to a temperature of 1000° F. and introduced into a reaction chamber containing chromium oxide on alumina catalyst, the temperature in the catalyst chamber averaging 980° F. The naphtha was fed to the catalyst chamber at a rate of 0.4 liquid volume per hour per volume of catalyst space. About 70% liquids were obtained containing somewhat more than 60% aromatics.

The total product from the dehydrogenation zone, without gas separation was cooled and brought up to a pressure of 1500 pounds per square inch and 5000 cubic feet additional hydrogen per barrel based on the aromatics present was added. Since the original naphtha was of low sulfur content which was further reduced during dehydrogenation, the dehydrogenated products were hydrogenated in the presence of a highly active catalyst comprising nickel on kieselguhr, the nickel content of the catalyst being 35%. The reaction temperature was 500° F. After hydrogenation, the reaction products were cooled and separated. The gaseous materials were passed through an absorber to purify the hydrogen which was recycled to the dehydrogenation zone in part and part to the hydrogenation zone. The liquid materials were stabilized and then solvent extracted. There were obtained about 15% substantially paraffinic hydrocarbons (based on the original naphtha charge) which were recycled to the dehydrogenation zone and 55% (calculated similarly) substantially naphthenic hydrocarbons which were catalytically cracked.

The naphthenic hydrocarbons were catalytically cracked at 200 mm. pressure in the presence of a catalyst similar to that described in my copending application Serial Number 305,472, filed November 21, 1939. The reaction temperature was 1175° F. and the conversion per pass was about 40%, the contact time being 7.5 seconds. By recycling, some 80% of the liquid charge was converted to gases of which 19.6% by volume was butadiene. About 15% of the total charge to the unit was eliminated as tar. As has been mentioned, this could have been sent to the hydrogenation zone if such a course had been desirable.

As has been mentioned, the above example is highly specific, purely illustrative and non-limiting.

Having now described and illustrated one embodiment of my invention, it is to be understood that said invention is not to be limited to any specific form, arrangement or condition herein given or specifically covered in the appended claims.

I claim:

1. In the manufacture of diolefins from a hydrocarbon naphtha at least the major portion of which boils within the usual motor fuel range, the steps including adding hydrogen from a source hereinafter described to said hydrocarbon naphtha, subjecting the blend, in the presence of a combined dehydrogenating-ring closing catalyst, to a temperature in the approximate range 850–1200° F. for a time sufficient to effect the formation of a high yield of aromatics within the usual motor fuel boiling range and hydrogen, subjecting the mixture, in the presence of a hydrogenating catalyst, to a temperature in the approximate range 400–850° F. for a time sufficient to effect the conversion of a substantial portion of said aromatics to naphthenes, separating hydrogen from the resulting products, recycling at least a part of said hydrogen to the point hereinbefore mentioned, separating the liquid products into a portion rich in cyclic hydrocarbons and a portion rich in acyclic hydrocarbons, adding said portion rich in acyclic hydrocarbons to the aforementioned hydrocarbon naphtha for recycling to the dehydrogenating-ring closing zone and splitting said portion rich in cyclic hydrocarbons at a temperature in the approximate range 900–1450° F. with the production of a gas rich in diolefins.

2. The process of claim 1 further characterized by the fact that the said naphthene hydrocarbons in the portion rich in cyclic hydrocarbons are split by contacting them with a cracking catalyst in the temperature range specified for a time sufficient for conversion of a substantial portion of said naphthenic hydrocarbons to a gas rich in diolefins.

3. In the manufacture of diolefins from a hydrocarbon naphtha at least the major portion of which boils within the usual motor fuel range, the steps including adding hydrogen from a source hereinafter described to said hydrocarbon naphtha, subjecting the blend, in the presence of a combined dehydrogenating-ring closing catalyst, to a temperature in the approximate range 850–1200° F. for a time sufficient to effect the formation of a high yield of aromatics within the usual motor fuel boiling range and hydrogen, adding additional hydrogen from a source hereinafter described to the resulting products, subjecting the blend, in the presence of a hydrogenation catalyst, to a temperature in the approximate range 400–850° F. for a time sufficient to effect the conversion of a substantial portion of said aromatics to naphthenes, separating hydrogen from the resulting products, dividing at least a portion of said hydrogen into two parts, recycling said parts to the points hereinbefore mentioned, separating the liquid products into a portion rich in cyclic hydrocarbons and a portion rich in acyclic hydrocarbons, adding said portion rich in acyclic hydrocarbons to the aforementioned hydrocarbon naphtha for recycling to the dehydrogenating-ring closing zone and splitting said portion rich in cyclic hydrocarbons at a temperature in the approximate range 900–1450° F. with the production of a gas rich in diolefins.

4. The process of claim 3, further characterized by the fact that the said naphthene hydrocarbons in said portion rich in cyclic hydrocarbons are split by contacting them with a cracking catalyst in the temperature range specified for a time sufficient for conversion of a substantial portion of said naphthenic hydrocarbons to a gas rich in diolefins.

ROBERT F. RUTHRUFF.